United States Patent [19]

Cornell et al.

[11] Patent Number: 4,788,241

[45] Date of Patent: Nov. 29, 1988

[54] TIRE HAVING TREAD COMPOSITION COMPRISING AN IMPROVED PROCESSING AID

[75] Inventors: Robert J. Cornell, Naugatuck; Sung W. Hong, Cheshire, both of Conn.

[73] Assignee: Uniroyal Chemical Company, Inc., Middlebury, Conn.

[21] Appl. No.: 112,178

[22] Filed: Oct. 22, 1987

[51] Int. Cl.$^4$ ............ C08L 7/00; C08L 9/00; C08L 9/02; C08L 9/06

[52] U.S. Cl. .................... 524/311; 524/318; 524/426; 524/452; 524/487; 152/209 R

[58] Field of Search ............ 524/311, 318, 426, 487, 524/452; 152/209 R

[56] References Cited

U.S. PATENT DOCUMENTS

| | | | |
|---|---|---|---|
| 2,360,896 | 10/1944 | Sarbach | 524/311 |
| 2,776,693 | 1/1957 | Ferrin | 524/311 |
| 3,838,080 | 9/1974 | Shinomura et al. | 524/487 |
| 3,856,731 | 12/1974 | Shinomura | 524/487 |
| 4,616,685 | 10/1986 | Harakon et al. | 524/318 |
| 4,748,199 | 5/1988 | Takiguchi et al. | 524/145 |

FOREIGN PATENT DOCUMENTS 61-81444  4/1986  Japan .................. 524/311

*Primary Examiner*—Allan M. Lieberman
*Attorney, Agent, or Firm*—William E. Dickheiser

[57] ABSTRACT

Tires possessing a tread composition formed by curing a blend comprised of: (A) at least one suitable rubber; (B) an effective amount of curative; (C) carbon black; and (D) a processing aid comprised of (i) $C_{12}$-$C_{50}$ paraffin wax; and (ii) pentaerythritol tetrastearate, which processing aid preferably further comprises a carrier such as calcium carbonate are most easily processed and exhibit improved handling, durability and rolling resistance as well as reduced heat buildup.

11 Claims, No Drawings

TIRE HAVING TREAD COMPOSITION COMPRISING AN IMPROVED PROCESSING AID

FIELD OF THE INVENTION

This invention relates to a more easily processed tire having improved handling, durability and rolling resistance as well as reduced heat buildup, which tire possesses a tread composition formed by curing a blend comprised of: (A) at least one suitable rubber; (B) an effective amount of curative; (C) carbon black; and (D) a processing aid comprised of (i $C_{12}$–$C_{50}$ paraffin wax; and (ii) pentaerythritol tetrastearate, which processing aid preferably further comprises a carrier such as calcium carbonate.

BACKGROUND OF THE INVENTION

The treads of modern tires must meet performance standards which require a broad range of desirable properties. Thus, rubber compositions suitable for tire treads should exhibit not only desirable strength and elongation, particularly at high temperatures, but also good cracking resistance, good abrasion resistance, desirable skid resistance and low tan delta values at low frequencies for desirable rolling resistance. Additionally, a high complex dynamic modulus is necessary for maneuverability and steering control.

It has long been recognized that rubber compositions composed of rubber, curative and carbon black alone possessed too high a Mooney viscosity to be reasonably processed into tire tread compositions. Accordingly, it has become conventional in several applications to extend the rubber with an aromatic oil prior to processing, thereby reducing the Mooney viscosity of the rubber composition to a readily processable degree.

However, the incorporation of excessive amounts of such oil has been found to adversely affect the tensile properties, especially the tensile strength and modulus, of the resulting composition. Thus, it would be desirable to possess a processing aid which would increase the processability of a tire tread composition and which would not adversely affect the tensile properties of the cured composition.

Accordingly, it is an object of this invention to provide a tire having a tread composed of a composition which is readily processed.

It is a further object of this invention to provide a tire having a readily processed tread exhibiting improved rolling resistance.

It is yet another object of this invention to provide a readily processed tire having a tread having an improved flexural modulus.

These objects, and other additional objects will become more apparent from the following description and accompanying Examples.

DESCRIPTION OF THE INVENTION

This invention is directed to a tire having a tread composition formed by curing a blend comprised of:
  (A) at least one suitable rubber;
  (B) an effective amount of a curative;
  (C) carbon black: and
  (D) a processing aid comprised of:
    (i) $C_{12}$–$C_{50}$ paraffin wax; and
    (ii) pentaerythritol tetrastearate.

The tires of this invention possess a tread composition which is readily processed and which, upon curing, exhibits desirable rolling resistance, flexural strength and resistance to heat buildup.

The tire tread compositions employed in the tires of this invention are comprised of (A) at least one suitable rubber; (B) a curative; (C) carbon black; and (D) a processing aid comprised of (i) $C_{12}$–$C_{50}$ paraffin wax and (ii) pentaerythritol tetrastearate.

The rubber component of the tread composition may be composed of any rubber suitable for tire tread stock, which rubbers are well known to those of ordinary skill in the tire compounding art. Illustrative of such rubbers are natural rubber, cis-polyisoprene, polybutadiene, solution and emulsion poly(styrene-butadiene), ethylene/propylene/nonconjugated diene terpolymer and poly(acrylonitrile-butadiene). Moreover, mixtures of two or more rubbers may be employed.

The curative employed in the practice of this invention may comprise any curative suitable for producing desirable vulcanization of the rubber component. Typically, for highly unsaturated rubbers, sulfur or a sulfur donor compound such as 2-(4-morpholinyldithio)benzothiazole, tetramethylthiuram disulfide, tetraethylthiuram disulfide, dipentamethylene thiuram hexasulfide, N,N'-carpolactam disulfide and the like, may be employed.

Alternatively and/or additionally, the curative employed may comprise, in the appropriate circumstance, a (hydro)peroxide such as benzoyl peroxide, 1,3-bis(t-butylperoxyisopropyl)benzene, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and the like.

Moreover, when sulfur or a sulfur donor is employed as the curative, a sulfur cure accelerator may also be added. Illustrative of the sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; xanthates, such as zinc dibutylxanthate and the like; dithiocarbamates, such as zinc dimethyldithiocarbamate, zinc diethyldithiocarbamate, zinc dibutyldithiocarbamate, sodium diethyldithiocarbamate, and the like; thiuramsulfides, such as dipentamethylenethiuram disulfide, dipentamethylenethiuram hexasulfide, tetrabutylthiuram tetraethylthiuram monosulfide, tetramethylthiuram monosulfide, monosulfide, tetraethylthiuram disulfide and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzothiazylsulfenamide, N-cyclohexyl-2-benzothiazylsulfenamide, N,N-diisopropyl-2-benzothiazylsulfenamide and the like.

Generally, between about 0.2 and about 5, preferably between about 0.5 and about 3, and more preferably between about 0.5 and about 1.5 parts by weight of curative per one hundred parts by weight of rubber are employed.

When employed, the sulfur cure accelerator is generally present in amounts of between about 0.1 part and about 5 parts by weight per 100 parts by weight of rubber, with preferably between about 0.3 part and about 3.0 parts of accelerator per 100 parts by weight of rubber being present. Most preferably, between about 0.3 part and about 1.0 part of accelerator per 100 parts by weight of rubber are employed.

The carbon black component of the tread compositions of the tires of this invention may comprise any of the blacks typically employed in tire treads. Illustrative of such carbon blacks are high abrasion blacks, such as N330 blacks; high abrasion-high structure blacks, such as N339, N347 and N375 blacks; intermediate super abrasion blacks, such as N220 and N234 blacks; and super abrasion blacks, such as N110 blacks. Moreover, mixtures of two or more carbon blacks may be employed.

Typically, the carbon black will be present in amounts of between about 30 and about 100 parts by weight per 100 parts by weight of rubber (phr). For new tires, the carbon black will most preferably be present at between about 50 and about 60 phr, while for retreads the carbon black content will most preferably range between about 60 and about 80 phr.

The processing aid employed in the tires of this invention is comprised of (i) $C_{12}$–$C_{50}$ paraffin wax and (ii) pentaerythritol tetrastearate. It is greatly preferred that the wax component contain a broad spectrum of polymers within the $C_{12}$–$C_{50}$ range. Generally, the weight ratio of pentaerythritol tetrastearate to paraffin wax will range between about 12:1 and about 2:1, preferably between about 10:1 and about 4:1, most preferably between about 8:1 and about 5:1.

Although the components of the processing aid may be added separately, it is preferred that such components be preblended along with a suitable carrier prior to incorporation into the tread composition. A variety of suitable carriers may be employed, such as talc, silica, carbon black, and the like, with calcium carbonate being particularly preferred. Preferably, such carrier may comprise between about 10 and about 75, more preferably between about 20 and about 40 percent by weight of the carrier/paraffin/pentaerithritol tetrastearate blend.

Typically, between about 0.5 part and about 10 parts by weight of processing aid per 100 parts by weight of rubber are employed. Preferably, between about 1 and about 7, more preferably between about 2 and about 5, parts of processing aid per 100 parts by weight of rubber are employed.

In addition to the rubber, curative, carbon black and processing aid composition described above, the tread composition of the tire of this invention may further comprise zinc oxide, reinforcing agents, fillers, extender oils, plasticizers, antidegradients, and the like, all of which additional components are well known to those skilled in the rubber art.

Preferably, between about 2 and about 10 grams of zinc oxide per hundred grams of rubber are employed, although amounts in excess of 10 grams may also be employed. Most preferably, between about 3 and about 5 grams of zinc oxide per 100 grams of rubber are present.

The tread composition of this invention is typically compounded by first mixing all the ingredients except the curative composition in a suitable mixing device (such as a Banbury [trademark]type internal mixer, a two roll mill, or the like). Such mixing will typically require about 5 minutes, although shorter or longer mixing periods may be employed. This mixing may be performed at temperatures ranging from room temperature or cooler up to about 150° C. or higher. If mixing temperatures above the activation temperature of the curing agent are employed, upon completion of the mixing the blended rubber is cooled or allowed to cool to a temperature below such activation temperature. The curative composition is then incorporated into the blend by subsequent mixing or milling, typically at temperatures up to about 110° C.

The blended composition may then be extruded through a suitable die to form an uncured tread slab which is used by means well known to those skilled in the art to produce the tires of this invention.

The tires of this invention not only are more efficiently and economically produced, but they also possess a tread composition exhibiting desirable strength and durability. Moreover, such tires have desirable rolling resistance, skid resistance and handling characteristics.

EXAMPLES

The following Examples are intended to further illustrate the invention and are not intended to limit the scope of the invention in any manner.

EXAMPLES 1 AND 2 AND COMPARATIVE EXPERIMENT A

Employing the ingredients indicated in Table I (which are listed in parts by weight) several rubber compositions were compounded in the following manner. The styrene-butadiene rubber (emulsion SBR 1500) and polybutadiene (polybutadiene 1203) were charged into type B Banbury (trademark) internal mixer set at No. 2 speed with its water cooling apparatus turned on. After one minute, half the carbon black (N234) was charged to the mixer. After two more minutes, the remainder of the carbon black along with the zinc oxide, stearic acid, antioxidant (Flexone [trademark]7L, N-phenyl-$N^1$(1,3-dimethylbutyl)-p-phenylenediamine), aromatic oil (Sundex [trademark]790), antiozonant (Sunproof Improved [trademark], mixture of waxy materials, m.p. 60°–65° C.) and (in the Examples) processing aid were added. Mixing was continued for an additional five minutes and the resultant masterbatch was removed from the blender.

Cured samples of each masterbatch were prepared as follows. A sufficient amount of each masterbatch such that 100 parts of rubber was present was blended with 1.5 parts of sulfur, 0.5 parts of 2(4-morpholinylmercapto)benzothiazole (Delac MOR) and 1.0 part of thiocarbamyl sulfenamide. The compounded stock was then sheeted out and samples cut for cure.

TABLE I

| EXAMPLE OR COMPARATIVE EXPERIMENT | A | 1 | 2 |
|---|---|---|---|
| Styrene-Butadiene Rubber | 75 | 75 | 75 |
| Butadiene Rubber | 25 | 25 | 25 |
| Carbon Black | 55 | 55 | 55 |
| Extender Oil | 20 | 20 | 20 |
| Zinc Oxide | 3 | 3 | 3 |
| Stearic Acid | 1.5 | 1.5 | 1.5 |
| Antioxidant | 1.0 | 1.0 | 1.0 |
| Antiozonant | 0.5 | 0.5 | 0.5 |
| Processing Aid I* | — | 3 | — |
| Processing Aid II** | — | — | 3 |
| | 176 | 179 | 179 |

Processing Aid I - A blend comprised of 29.5 weight percent calcium carbonate; 8.9 weight percent $C_{24}$–$C_{40}$ wax; and 61.6 weight percent PNTS.
Processing Aid II - A blend comprised of 27.1 weight percent calcium carbonate; 10.9 weight percent $C_{19}$–$C_{36}$ wax; and 62 weight percent PNTS.

The initial Mooney viscosity of each sample was measured along with the stress strain properties and dynamic properties of samples which had been cured for 10 minutes at 350° F. (177° C.). The resulte of such testing are summarized in Table II.

TABLE II

| EXAMPLE OR COMPARATIVE EXPERIMENTS | A | 1 | 2 |
|---|---|---|---|
| Mooney Viscosity ML 1 + 4 @ 212° F. | 56 | 52 | 51 |
| Cured Properties at Room Temperature (RT) | | | |
| Tensile Strength | 3390 | 3350 | 3500 |
| % Elongation | 570 | 590 | 630 |
| S-300 Modulus | 1360 | 1260 | 1150 |
| Tear (Die C) (lbs/in) | 300 | 330 | 300 |
| Shore A hardness | 61 | 65 | 63 |
| Dynamic Properties | | | |
| Tan δ at RT | .221 | .207 | .185 |
| Flexural Modulus RT (G*, dyne/cm$^2$ × 10$^7$) | 7.22 | 8.82 | 7.77 |
| Tan δ at 50° C. | .204 | .175 | .151 |
| Flexural Modulus at 50° C. | 5.41 | 6.13 | 5.72 |
| Tan δ at 75° C. | .193 | .150 | .130 |
| Flexural Modulus at 75° C. | 4.40 | 5.02 | 4.71 |
| Tan δ at 100° C. | .176 | .134 | .112 |
| Flexural Modulus at 100° C. | 3.85 | 4.34 | 4.03 |

The above results indicate the desirable tensile properties of the tread compositions of this invention.

Moreover, the lower tan delta values at a frequency of 11 Hz at 25°–75° C. exhibited by the compositions of this invention, relative to those of the corresponding Comparative Experiment, are indicative of the superior rolling resistance exhibited by the tires of this invention. Further, the lower tan delta values at 75° C.–100° C. show the reduced heat buildup and improved durability exhibited by the compounds of the present invention.

In addition, the increased flexural modulus exhibited by the Examples of this invention indicate the improved handling characteristics of the tires of this invention.

EXAMPLES 3 AND COMPARATIVE EXPERIMENT B

Employing a process essentially identical to that employed in the Examples above, several high modulus tire tread stocks were prepared. The ingredients employed are the same as those employed above, except that natural rubber (type 5CV), a high vinyl (85% vinyl groups) butadiene rubber, and solution styrene-butadiene rubber were employed. The masterbatches produced are summarized in Table III below.

TABLE III

| EXAMPLE OR COMPARATIVE EXPERIMENT | B | 3 |
|---|---|---|
| Styrene-Butadiene Rubber | 50 | 50 |
| High Vinyl Butadiene Rubber | 25 | 25 |
| Natural Rubber | 25 | 25 |
| Carbon Black | 55 | 55 |
| Zinc Oxide | 3 | 3 |
| Stearic Acid | 1 | 1 |
| Naphthenic Oil | 20 | 20 |
| Antioxidant | 1.0 | 1.0 |
| Antiozonant | 0.5 | 0.5 |
| Processing Aid I | — | 3 |

The above masterbatches were cured as described in the Examples above except that an additional 0.5 part of dithiomorpholine, a cure accelerator was added. The dynamic and stress strain properties of such samples were evaluated. The results of such evaluation are summarized in Table IV.

TABLE IV

| EXAMPLE OR COMPARATIVE EXPERIMENT | B | 3 |
|---|---|---|
| Mooney Viscosity ML 1 + 4 @ 212° F. | 71 | 64 |
| Properties at RT | | |
| Tensile Strength | 2580 | 2680 |
| % Elongation | 340 | 350 |
| S-300 | 2250 | 2140 |
| Tear Strength (Die C) | 230 | 230 |
| Shore A | 71 | 70 |
| Dynamic Properties | | |
| Tan δ at RT | .174 | .166 |
| Flexural Modulus at RT | 6.81 | 7.71 |
| Tan δ 50° C. | .158 | .144 |
| Flexural Modulus at 50° C. | 5.51 | 5.76 |
| Tan δ 75° C. | .140 | .132 |
| Flexural Modulus at 75° C. | 4.70 | 5.00 |
| Tan δ 100° C. | .128 | .110 |
| Flexural at 100° C. | 4.24 | 4.37 |

The data in Table IV above show that despite the lower Mooney viscosity (and increased processability) of the composition of Example 3 relative to that of Comparative Experiment B, the tensile properties of such compositions are roughly equal and the dynamic properties of the composition of this invention are greatly improved.

What is claimed is:

1. A tire having a tread composition formed by curing a blend comprised of:
   A. a rubber selected from the group consisting of natural rubber, cis-polyisoprene, polybutadiene, solution poly(styrene-butadiene), emulsion poly(styrene-butadiene), ethylene/propylene/nonconjugated diene terpolymer and poly(acrylonitrile-butadiene);
   B. between about 0.2 and about 5 phr of a curative selected from the group consisting of sulfur, sulfur donor compounds, hydroperoxides and peroxides;
   C. between about 30 and about 100 phr of carbon black; and
   D. between about 0.5 and about 10 phr of a processing aid comprised of:
      (1) $C_{12}$–$C_{50}$ parraffin wax: and
      (11) pentaerythritol tetrastearate wherein the weight ratio of pentaerythritol tetrastearate to $C_{12}$–$C_{50}$ paraffin wax is between about 12:1 and about 2:1.

2. A tire in accordance with claim 1 wherein between about 0.5 and about 3 phr of curative are present.

3. A tire in accordance with claim 2 wherein between about 0.5 and about 1.5 phr of curative are present.

4. A tire in accordance with claim 1 wherein the weight ratio of component ii to component i is between about 10:1 and 4:1.

5. A tire in accordance with claim 4 wherein the weight ratio of component ii to component i is between about 8:1 and about 5:1.

6. A tire in accordance with claim 1 wherein the processing aid further comprises a carrier celected from the group consisting of calcium carbonate, talc, silica and carbon black.

7. A tire in accordance with claim 6 wherein said carrier is calcium carbonate.

8. A tire in accordance with claim 7 wherein said carrier comprises between about 10 and about 75 weight percent of said processing aid.

9. A tire in accordance with claim 1 wherein between about 1 and about 7 phr of processing aid is present.

10. A tire in accordance with claim 9 wherein between about 2 and about 5 phr of processing aid is present.

11. A tire in accordance with claim 15 wherein between about 50 and about 80 phr of carbon black is present.

* * * * *